(12) United States Patent
Dholakia (10) Patent No.: US 11,762,180 B2
(45) Date of Patent: Sep. 19, 2023

(54) THREE-PHOTON LIGHT SHEET IMAGING

(71) Applicant: UNIVERSITY COURT OF THE UNIVERSITY OF ST ANDREWS, St Andrews (GB)

(72) Inventor: Kishan Dholakia, St Andrews (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 530 days.

(21) Appl. No.: 16/622,542

(22) PCT Filed: Jun. 15, 2018

(86) PCT No.: PCT/GB2018/051667
§ 371 (c)(1),
(2) Date: Dec. 13, 2019

(87) PCT Pub. No.: WO2018/229508
PCT Pub. Date: Dec. 20, 2018

(65) Prior Publication Data
US 2021/0033837 A1    Feb. 4, 2021

(30) Foreign Application Priority Data

Jun. 16, 2017  (GB) .................................... 1709593

(51) Int. Cl.
 *G02B 21/00*   (2006.01)
 *G01N 21/64*   (2006.01)
(52) U.S. Cl.
 CPC ..... *G02B 21/0032* (2013.01); *G01N 21/6458* (2013.01); *G01N 21/6486* (2013.01);
(Continued)

(58) Field of Classification Search
 CPC ............ G02B 21/0032; G02B 21/0076; G02B 2207/114; G02B 21/367; G02B 21/16;
(Continued)

(56) References Cited

U.S. PATENT DOCUMENTS

| 4,835,078 A | * | 5/1989 | Harvey | ................. | H01L 21/682 |
| | | | | | 430/394 |
| 2007/0057211 A1 | * | 3/2007 | Bahlman | ............ | G01N 21/6452 |
| | | | | | 250/584 |

(Continued)

FOREIGN PATENT DOCUMENTS

| CN | 104407436 A | 3/2015 |
| WO | 2011059826 A | 5/2011 |
| WO | 2017147528 A1 | 8/2017 |

OTHER PUBLICATIONS

Horton, Nicholas G., et al. "In vivo three-photon microscopy of subcortical structures within an intact mouse brain." Nature photonics 7.3 (2013): 205-209. (Year: 2013).*

(Continued)

*Primary Examiner* — Dominic J Bologna
(74) *Attorney, Agent, or Firm* — Moore & Van Allen PLLC; W. Kevin Ransom (57) ABSTRACT

A light sheet imaging system, such as a light sheet microscope, comprises an illumination arrangement for generating a light sheet for three-photon excitation of a fluorescent sample, and a fluorescence collection arrangement for collecting fluorescence generated in the sample as a result of three-photon excitation by the light sheet. The light sheet may be a non-diffractive, propagation-invariant light sheet. The light sheet may be formed from and/or comprise a Bessel beam. A method of light sheet imaging comprises using a light sheet for three-photon excitation of a fluorescent sample, and collecting fluorescence generated in the sample as a result of three-photon excitation of the sample (Continued)

by the light sheet. Such a method may be used for light sheet microscopy.

25 Claims, 9 Drawing Sheets

(52) U.S. Cl.
CPC . *G02B 21/0076* (2013.01); *G01N 2201/0633* (2013.01); *G01N 2201/0634* (2013.01); *G01N 2201/06113* (2013.01); *G01N 2201/08* (2013.01); *G02B 2207/114* (2013.01)

(58) Field of Classification Search
CPC .......... G01N 21/6458; G01N 21/6486; G01N 2201/06113; G01N 2201/0633; G01N 2201/0634; G01N 2201/08
See application file for complete search history.

(56) References Cited

U.S. PATENT DOCUMENTS

| | | | |
|---|---|---|---|
| 2011/0122488 A1* | 5/2011 | Truong | G02B 21/16 359/385 |
| 2012/0092770 A1* | 4/2012 | Li | G02B 5/1809 359/569 |
| 2014/0253714 A1* | 9/2014 | Weida | G02B 21/088 348/80 |
| 2016/0327779 A1* | 11/2016 | Hillman | G02B 21/361 |
| 2017/0068080 A1 | 3/2017 | Anhut et al. | |
| 2017/0082531 A1* | 3/2017 | Okada | G01N 15/1434 |
| 2019/0129278 A1* | 5/2019 | Ichihara | G02F 1/365 |
| 2021/0001430 A1* | 1/2021 | Ungaro | B23K 26/0622 |

OTHER PUBLICATIONS

University Court of the University of St Andrews, International Application No. PCT/GB2018/051667, International Preliminary Report on Patentability, dated Dec. 26, 2019.

University Court of the University of St Andrews, Great Britain Application No. GB1709593.6, Search Report, dated Dec. 8, 2017.
University Court of the University of St Andrews, International Application No. PCT/GB2018/051667, International Search Report, dated Nov. 9, 2018.
University Court of the University of St Andrews, International Application No. PCT/GB2018/051667, Written Opinion, dated Nov. 9, 2018.
Coherent, Inc., "Femtosecond Lasers for Life Sciences," 2016, 16 pages.
Power, R., et al., "A guide to light-sheet fluorescence microscopy for multiscale imaging," Nature Methods, Apr. 1, 2017, vol. 14, No. 4, pp. 360-373.
Siviloglou, G.A., et al., "Observation of Accelerating Airy Beams", Physics Review Letters 99, 2007, pp. 213901-1 to 213901-4.
Davis, J.A., et al., "Observation of accelerating parabolic beams", Optics Express, 2008, vol. 16, No. 17, pp. 12866-12871.
Chen, Bi-Chang, et al., Lattice light-sheet microscopy: Imaging molecules to embryos at high spatiotemporal resolution, Science, Oct. 24, 2014, pp. 1257998-1-1257998-12, vol. 346, issue 6208.
Huland, David M., et al., Three-photon excited fluorescence imaging of unstained tissue using a GRIN lens endoscope, Biomedical Optics Express, 2013, pp. 652-658, vol. 4, No. 5.
Engelbrecht, Christoph J., et al., Miniaturized selective plane illumination microscopy for high-contrast in vivo fluorescence imaging, Optics Letters, 2010, pp. 1413-1415, vol. 35, No. 9.
Yang, Zhengyi, et al., A compact Airy beam light sheet microscope with a tilted cylindrical lens, Biomedical Optics Express, 2014, p. 3434-3442, vol. 5, No. 10.
Vettenburg, T., et al., Light-sheet microscopy using an Airy beam, Nature Methods, 2014, pp. 541-544, vol. 11, No. 5.
Hell, Stefan W., et al., Three-photon Excitation in Fluorescence Microscopy, Journal of Biomedical Optics, 1996, pp. 71-74, vol. 1, No. 1.
Huisken, Jan, et al., Selective plane illumination microscopy techniques in developmental biology, Development, 2009, pp. 1963-1975, vol. 136, No. 12.
Horton, Nicholas G., et al., In vivo three-photon microscopy of subcortical structures within an intact mouse brain, Nature Photonics, 2013, pp. 205-209, vol. 7, No. 3.

* cited by examiner

THREE-PHOTON LIGHT SHEET IMAGING

CROSS-REFERENCE TO RELATED APPLICATIONS

This application is a national stage application (filed under 35 § U.S.C. 371) of PCT/GB2018/051667, filed Jun. 15, 2018 of the same title, which, in turn, claims priority to United Kingdom Application No. 1709593.6 filed Jun. 16, 2017; the contents of each of which are hereby incorporated by reference.

FIELD OF THE INVENTION

The present invention relates to a three-photon light sheet imaging system and method for use, in particular though not exclusively, for three-photon light sheet microscopy.

BACKGROUND OF THE INVENTION

Light sheet fluorescence microscopy (LSFM), also known as selective plane illumination microscopy (SPIM), is becoming increasingly important in biological research for monitoring the development of larger three-dimensional samples, especially for monitoring biological samples in vivo. In LSFM, only a thin layer of the sample is illuminated at a time and the images are captured along a detection axis which is generally perpendicular to the illuminated plane. Such optical sectioning ability enables relatively high-contrast, high resolution imaging, whilst minimizing sample exposure and photo-toxicity.

The resolution of LSFM methods along the detection axis is determined by a combination of the numerical aperture of the detection objective and the extent or thickness of the light sheet along the detection axis. For Gaussian-beam illumination, a large field of view requires a relatively thick light sheet, thus compromising the resolution along the detection axis and exposing the sample unnecessarily to irradiation. Known LSFM methods may not provide sufficient image contrast or sufficient signal-to-background ratio (SBR) for some imaging applications.

SUMMARY OF THE INVENTION

It should be understood that one or more of the features of any of the following aspects of the present invention may apply alone or in any combination in relation to any of the other aspects of the present invention.

According to an aspect of the present invention there is provided a light sheet imaging system comprising:

an illumination arrangement for generating a light sheet for three-photon excitation of a fluorescent sample; and a fluorescence collection arrangement for collecting fluorescence generated in the sample as a result of three-photon excitation by the light sheet.

It has been found that the average intensity levels required for three-photon light sheet excitation are surprisingly low relative to the photo-toxic average intensity levels which can destroy the viability of a biological sample such as a cell. The use of three-photon excitation for light sheet imaging of a fluorescent sample allows the use of an excitation wavelength which is three times longer than the excitation wavelength required for single photon excitation. This may reduce scattering of the light sheet within the sample. For example, it is well known that Rayleigh scattering is dependent upon $1/\lambda^4$. Consequently, the use of three-photon excitation reduces Rayleigh scattering by a factor of 81 when compared with the use of single-photon excitation. The reduction in scattering of the light sheet within the sample increases the penetration of the light sheet into the sample, permitting light sheet imaging at greater depths compared with the use of single-photon or two-photon excitation for light sheet imaging. The reduction in scattering also enhances the signal-to-background (SBR) ratio for enhanced fluorescence image contrast compared with the fluorescence image contrast obtainable when using single-photon or two-photon excitation for light sheet imaging. In addition, the use of three-photon excitation for light sheet imaging leads to an effective reduction in the beam waist compared with the use of single-photon or two-photon excitation in a direction transverse or generally perpendicular to the light sheet. This may lead to an enhancement in axial resolution along a fluorescence collection or imaging axis.

The light sheet may comprise one or more wavelengths in the range 700 nm to 1800 nm.

The light sheet may be configured for three-photon excitation of endogenous fluorophores such as NADH and/or flavins.

The light sheet may comprise one or more wavelengths which are between 1030 nm and 1050 nm, for example at or around 1040 nm.

The light sheet may comprise one or more wavelengths which are between 1540 nm and 1560 nm, for example at or around 1550 nm.

The light sheet may be configured for three-photon excitation of exogenous fluorophores such as green fluorescent protein (GFP) or red fluorescent protein (RFP).

The light sheet may comprise one or more wavelengths which are between 1665 nm and 1685 nm, for example at or around 1675 nm.

The illumination arrangement may comprise an optical source. The optical source may be coherent. The optical source may be tuneable. The optical source may comprise a laser and/or an optical parametric oscillator (OPO).

The optical source may be configured to generate a stream of optical pulses.

The stream of optical pulses may have an average power of at least 1 mW, at least 5 mW, at least 10 mW, at least 50 mW or at least 100 mW.

Each optical pulse may have a duration of 1 ps or less, 500 fs or less, or 100 fs or less.

Each optical pulse may have an energy of at least 10 nJ, at least 50 nJ, at least 100 nJ or at least 500 nJ.

The illumination arrangement may comprise a pulse compression arrangement for compressing the optical pulses.

The pulse compression arrangement may comprise one or more elements or components for providing anomalous dispersion. For example, the pulse compression arrangement may comprise one or more chirped mirrors and/or a hollow-core photonic bandgap fiber.

The pulse compression arrangement may comprise one or more elements or components for providing normal dispersion. For example, the pulse compression arrangement may comprise one or more elements or components comprising normally dispersive glass and/or a normally dispersive optical fiber.

The illumination arrangement may comprise a wavelength conversion element or component for converting or adjusting a wavelength of light generated by the optical source. The wavelength conversion element or component may comprise a photonic crystal rod for soliton self-frequency shifting.

The illumination arrangement may comprise a light sheet generating element.

The light sheet generating element may be configured for use in converting an optical beam, such as a circularly symmetric optical beam, into the light sheet. The light sheet generating element may comprise a cylindrical lens.

The light sheet generating element may comprise a cylindrical reflector or a cylindrical mirror.

The light sheet generating element may comprise a scanner, for example an acousto-optical scanner. Such a scanner may be used to scan a beam such as a circularly symmetric beam generated by the optical source across a plane of the sample to progressively generate the light sheet. Scanning a beam progressively in this way may allow light sheet imaging to be performed without unduly reducing the intensity of the light sheet.

The light sheet may be formed from and/or may comprise a superposition or an array of beams. The use of a superposition or an array of beams may allow a light sheet to be more easily or more rapidly formed compared with the use of a single beam because the use of a superposition or an array of beams means that the light sheet can be formed by scanning or dithering each beam over a smaller distance in a direction transverse to the direction of propagation.

The light sheet may be a non-diffractive, propagation-invariant light sheet.

One of ordinary skill in the art will understand that a perfectly non-diffractive, perfectly propagation-invariant optical beam such as a propagation-invariant light sheet only exists in theory and that, in practice, a non-diffractive, propagation-invariant optical beam may only be considered to be approximately non-diffractive and propagation-invariant over a finite distance. In particular, a non-diffractive, propagation-invariant optical beam has a transverse intensity profile which varies more slowly than a diffractive, propagation-variant optical beam such as a Gaussian beam of a comparable beam waist.

As such, a propagation invariant beam such as a propagation-invariant light sheet is used herein to refer to a beam that maintains its transverse profile or shape on propagation over a finite distance. Specifically, this can mean that a propagation invariant beam maintains its transverse profile or shape in a transverse plane (x,y) on propagation over a finite distance along a z direction (assuming x,y,z are orthogonal Cartesian co-ordinates). Ideally this means these beams would satisfy a relation such that $I(x,y,z=0)=I(x,y,z>0)$ where I denotes the transverse spatial profile. In practice, however, such beams cannot be propagation invariant or diffraction-free indefinitely and such beams can only be considered to be propagation invariant or diffraction-free over a finite distance.

One of ordinary skill in the art will understand that for a propagation invariant beam which has a structured pattern in the transverse plane (x,y), the spacing between features in the transverse (x,y) plane remains the same after propagation over a finite distance. That is, there is no radial scaling after propagation over a finite distance. For such propagation invariant beams, it should be understood that although the relative intensities of the different features of the transverse spatial profile may vary after propagation over a finite distance, there is no change in spacing between the different features of the transverse spatial profile i.e. there is no radial scaling. For example, a propagation-invariant Bessel beam includes a plurality of concentric rings in the transverse plane (x,y), wherein the spacing between the concentric rings remains the same after propagation over a finite distance, even if the relative intensities of the concentric rings actually change slightly after propagation over the finite distance. Similarly, an Airy beam includes a plurality of discrete lobes or features in the transverse plane (x,y), wherein the spacing between the discrete lobes or features remains the same after propagation over a finite distance, even if the relative intensities of the discrete lobes or features actually change slightly after propagation over the finite distance.

The use of a non-diffractive, propagation-invariant light sheet for three-photon light sheet imaging may provide superior axial resolution across a given field of view when compared with the use of a light sheet formed from and/or comprising a Gaussian beam for three-photon light sheet imaging across the same field of view. Alternatively, the use of a non-diffractive, propagation-invariant light sheet for three-photon light sheet imaging may provide the same axial resolution across an extended field of view when compared with the use of a light sheet formed from and/or comprising a Gaussian beam for three-photon light sheet imaging.

The illumination arrangement may comprise an optical component for use in generating the non-diffractive, propagation-invariant light sheet.

The optical component may be configured to convert the optical beam generated by the optical source into a non-diffractive, propagation-invariant optical beam and the light sheet generating element may be configured to convert the non-diffractive, propagation-invariant optical beam into the non-diffractive, propagation-invariant light sheet.

The light sheet generator may be configured to convert the optical beam generated by the optical source into an intermediate light sheet and the optical component may be configured to convert the intermediate light sheet into the non-diffractive, propagation-invariant light sheet.

The light sheet may have a symmetric intensity profile transverse to a direction of propagation.

The light sheet may be formed from and/or comprise a Bessel beam. Studies have suggested that the use of a light sheet formed from and/or comprising a Bessel beam for three-photon light sheet imaging may provide superior axial resolution across a given field of view defined by the light sheet within a sample when compared with the use of a light sheet formed from and/or comprising a Gaussian beam for three-photon light sheet imaging. Alternatively, the use of a light sheet formed from and/or comprising a Bessel beam for three-photon light sheet imaging may provide the same axial resolution across an extended field of view defined by the light sheet within a sample when compared with the use of a light sheet formed from and/or comprising a Gaussian beam for three-photon light sheet imaging.

The light sheet may be formed from and/or may comprise an Airy beam.

The light sheet may be formed from and/or may comprise a parabolic beam.

The optical component may comprise a fixed, static and/or passive optical component.

The optical component may comprise a phase mask.

The optical component may comprise an axicon. An axicon may be used to generate a Bessel beam.

The optical component may comprise a cylindrical lens which is tilted relative to a direction of propagation. Such a tilted cylindrical lens may be used to generate an Airy beam.

The optical component may be dynamic and/or re-configurable. The optical component may comprise a diffractive optical element. The optical component may comprise a spatial light modulator. The optical component may comprise a digital micro-mirror.

The light sheet may be formed from and/or may comprise at least one of a superposition or an array of Bessel beams, a superposition or an array of Airy beams, and a superposition or an array of parabolic beams.

The illumination arrangement may comprise an input lens for coupling the light sheet into the sample. The fluorescence collection arrangement may comprise an output lens for collecting fluorescence emitted from the sample. One or both of the input and output lenses may comprise a microscope objective. The input and output lenses may be arranged along orthogonal axes.

The illumination arrangement may comprise an input optical fiber for coupling light to the input lens. The fluorescence collection arrangement may comprise an output optical fiber for receiving light from the output lens. The input and output fibers may be arranged side-by-side.

One or both of the input and output lenses may comprise a gradient-index (GRIN) lens. The input and output lenses may be arranged with their optical axes parallel to one another.

The illumination arrangement may comprise a reflector, mirror, deflector or the like, for example a micro-prism deflector, for deflecting light received from the input lens.

The use of input and output GRIN lenses arranged with their respective optical axes parallel to one another together with the deflector may provide a compact three-photon fluorescence light sheet imaging system for use in in vivo imaging. The use of input and output optical fibers arranged side-by-side may further render the three-photon fluorescence light sheet imaging system suitable for use in in vivo imaging.

The fluorescence collection arrangement may comprise one or more further lenses and/or an image sensor such as a CMOS or CCD image sensor or a camera for imaging the collected fluorescence.

The light sheet imaging system may comprise or form part of, a light sheet microscope.

According to an aspect of the present invention there is provided a light sheet microscope comprising:

an illumination arrangement for generating a light sheet for three-photon excitation of a fluorescent sample; and a fluorescence collection arrangement for collecting fluorescence generated in the sample as a result of three-photon excitation by the light sheet.

According to an aspect of the present invention there is provided a method of light sheet imaging comprising:

using a light sheet for three-photon excitation of a fluorescent sample; and collecting fluorescence generated in the sample as a result of three-photon excitation of the sample by the light sheet.

BRIEF DESCRIPTION OF THE DRAWINGS

The present invention is described herein by way of non-limiting example only with reference to the drawings of which.

DETAILED DESCRIPTION OF THE DRAWINGS

Figure 1:
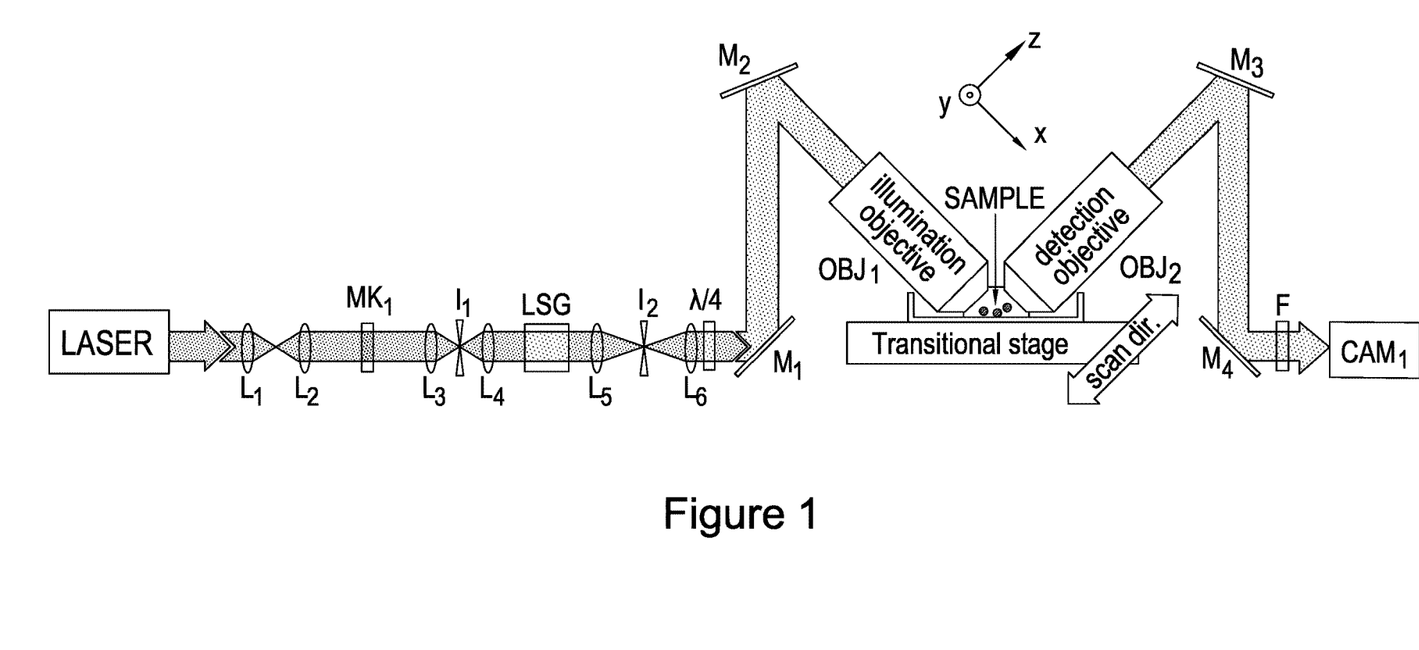
FIG. 1 is a schematic of a three-photon light sheet fluorescence microscopy system.

Referring initially to FIG. 1 there is provided a three-photon light sheet fluorescence microscopy system for imaging a sample such as a tissue sample, one or more particles, cells, colloids, organisms, organelles or the like. The sample may have been treated or otherwise exposed to an exogenous fluorescent substance such as an exogenous fluorophore or the like for three-photon excitation by a light sheet generated by the microscopy system. Alternatively, the sample may include an endogenous fluorescent substance such as an endogenous fluorophore such as NADH and/or one or more flavins for three-photon excitation by a light sheet generated by the microscopy system.

The illumination propagates along the x-direction, the beam is expanded along the y-direction to form the light sheet, and fluorescence is collected along the z-direction. The three-photon light sheet fluorescence microscopy system of FIG. 1 permits imaging of fluid-immersed samples on a horizontal surface such as a standard microscope slide or dish. This is enabled by positioning illumination and detection objectives at 45 degrees to the horizontal sample. By translating the sample and the detection objective along the z-direction as indicated by the "scan dir." arrow, different "planes" of the sample are illuminated sequentially by the light sheet and the fluorescence generated in each plane is collected and imaged onto an image sensor such as a camera ($CAM_1$) so that a three dimensional volumetric image can be recorded.

Figure 2A:
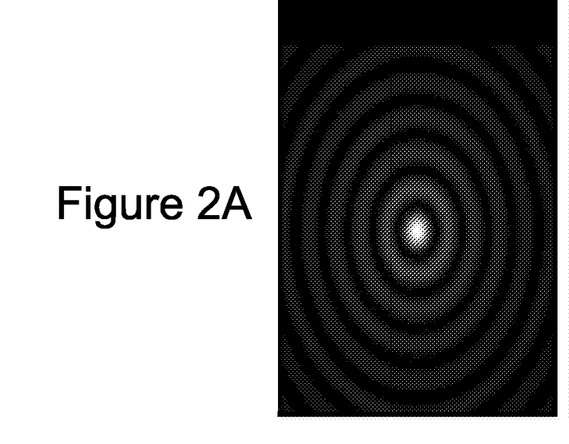
FIG. 2A is a two-dimensional transverse intensity profile of a Bessel beam of the microscopy system of FIG. 1.
Figure 2B:
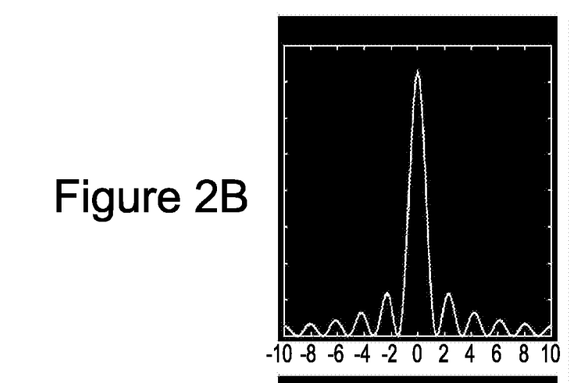
FIG. 2B is a one-dimensional transverse intensity profile of the Bessel beam of the microscopy system of FIG. 1.

The three-photon light sheet fluorescence microscopy system of FIG. 1 includes an illumination arrangement including a laser, an optical component $MK_1$ and a light sheet generating element (LSG). The optical component $MK_1$ may be a static optical component such as an axicon or a mask for the generation of a Bessel beam. Alternatively, the optical component $MK_1$ may be a dynamic optical component configured so as to generate a Bessel beam. For example, the optical component may be a spatial light modulator or a digital micro-mirror configured so as to generate a Bessel beam by reflection therefrom. As shown in FIGS. 2A and 2B, a Bessel beam has a bright central spot surrounded by a series of concentric rings which decrease in intensity with distance from the central spot. The LSG can be a cylindrical lens or a scanning device such as an acousto-optical deflector (AOD) for progressively generating a light sheet.

The beam-shaping arrangement includes a series of lenses L1 to L6 for coupling light from the laser towards the sample via the optical component $MK_1$ and the LSG. The beam-shaping arrangement further includes irises $I_1$ and $I_2$, a quarter waveplate $\lambda/4$, mirrors M1 and M2 and an illumination objective $OBJ_1$.

The three-photon light sheet fluorescence microscopy system of FIG. 1 includes a detection objective $OBJ_2$, a third mirror $M_3$, a fourth mirror $M_4$, a filter F for blocking light at the one or more excitation wavelengths and an image sensor or camera $CAM_1$.

Figure 2C:
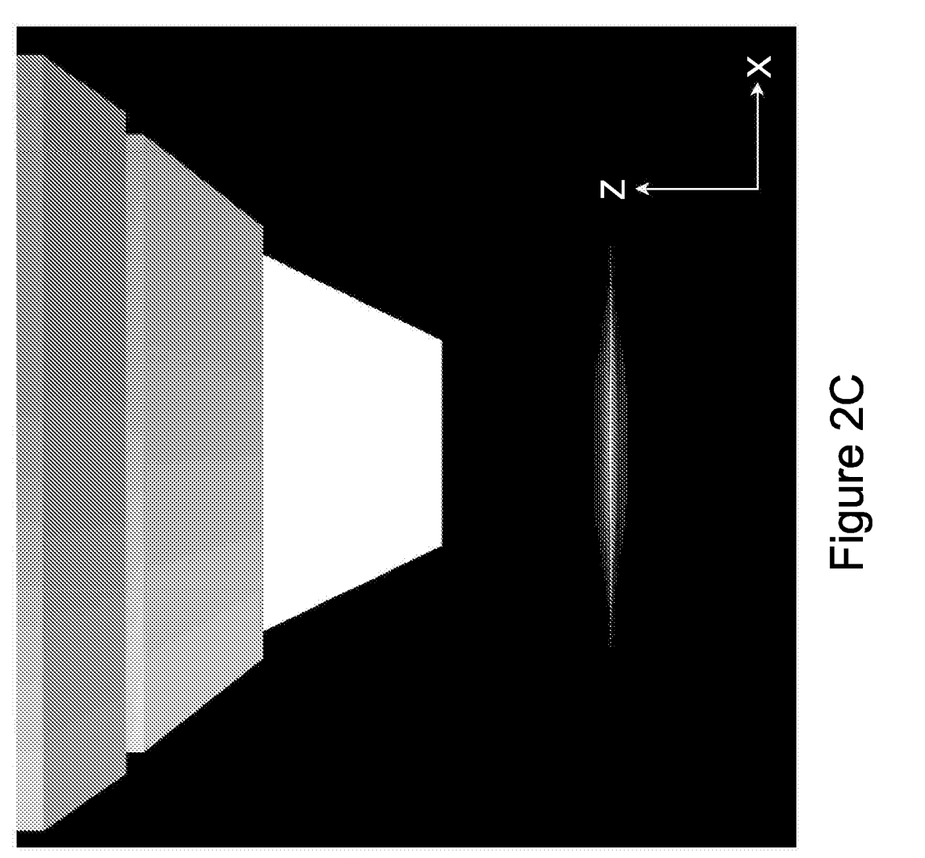
FIG. 2C is a schematic side view showing the arrangement of the detection objective above the light sheet formed using the Bessel beam of the microscopy system of FIG. 1.

In use, light from the laser is expanded by lenses $L_1$ and $L_2$ to match the optical component $MK_1$. Having passed through the optical component $MK_1$, the Bessel beam is then passed through lens $L_3$, where is it focused onto the iris $I_1$ and through another lens $L_4$, where it is shaped to the diameter of the LSG. The light sheet that is formed by the LSG is then passed through the lens $L_5$, where it is focused onto the iris $I_2$ and through another lens $L_6$, which collimates the light sheet onto the quarter wave plate $\lambda/4$, which provides polarization control. From there, the light sheet is reflected from the first mirror $M_1$ onto the second mirror $M_2$ and from there onto the illumination objective $OBJ_1$, which is positioned at 45 degrees to the horizontal sample stage. FIG. 2C shows a side view of the detection objective positioned adjacent the light sheet generated using the Bessel beam corresponding to the profiles of FIGS. 2A and 2B. Fluorescence generated in the sample passes through the detection objective $OBJ_2$ onto the third mirror $M_3$ and from there onto the fourth mirror $M_4$, where it is directed to the image sensor or camera $CAM_1$ via the filter F.

The mirrors $M_1$ to $M_4$ can be used to facilitate the vertical alignment of the objectives with the sample. In one example, mirrors $M_2$ and $M_3$ can be fixed with respect to the axis of the objectives $OBJ_1$ and $OBJ_2$, respectively. Appropriate alignment of mirrors $M_1$ and $M_4$ allows a vertical translation of both objectives $OBJ_1$ and $OBJ_2$ and mirrors $M_2$ and $M_3$ with respect to the sample stage without altering the alignment. Axial translation stages on the objectives may facilitate fine-tuning the alignment.

Various optional elements are included to control the polarization and to filter the light. Optionally, the irises, $I_1$ and $I_2$ may be included as shown in FIG. 1 to select the first diffraction orders to allow more flexibility and prevent unwanted illumination of the sample. Lenses $L_1$ to $L_6$ form telescopes to relay the light between the various components. The quarter waveplate $\lambda/4$ can be introduced to control the polarization of the light, e.g. by converting linear polarized light to circularly polarized light that produces a more uniform excitation of fluorescence. Light filters, F, e.g. to block excitation light and select fluorescence emission, can be introduced between $OBJ_2$ and the camera, $CAM_1$. If necessary or convenient, elements of the illumination path and the detection path can be brought closer than the mirrors to $OBJ_1$ and $OBJ_2$, respectively.

The laser is configured to generate light at one or more wavelengths in the range 1000 nm to 1800 nm for three-photon excitation of the fluorophore with which the sample is treated. For example, the laser may be configured to generate light having wavelengths around 1675 nm for the three-photon excitation of exogenous fluorophores. Alternatively, the laser may be configured to generate light having wavelengths around 1040 nm for the three-photon excitation of endogenous fluorophores such as NADH and/or one or more flavins.

The laser generates a stream of optical pulses with each pulse having a duration of the order of 100 fs or less and an energy of the order of 100 nJ at the light sheet. The illumination arrangement may include one or more elements or components for the compensation of dispersion associated with propagation of light via the various optical components between the laser and the sample. The laser may generate a light sheet with sufficient peak power to generate three-photon excitation of the fluorophore at relatively low average powers of only a few mWs and may provide enhanced image contrast or improved SBR at average intensity levels which are surprisingly low relative to the average intensity levels which can give rise to phototoxicity. Moreover, as described below with reference to FIGS. 3A to 3F, 4A to 4F, 5A and 5B, theoretical studies have demonstrated that use of a light sheet for three-photon fluorescence light sheet microscopy generated using a Bessel beam has the potential to provide high image contrast and superior image resolution across the light sheet compared with the use of a Gaussian beam.

Figure 3A:
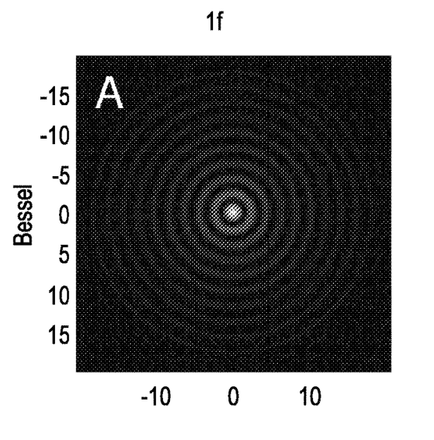
FIG. 3A is a simulated two-dimensional single-photon transverse intensity profile of a Bessel beam at the focal plane.
Figure 3B:
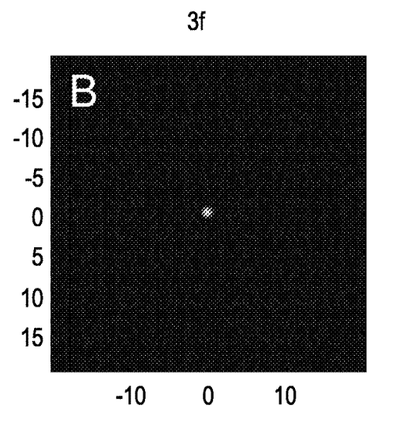
FIG. 3B is a simulated two-dimensional three-photon transverse intensity profile of a Bessel beam at the focal plane.
Figure 3C:
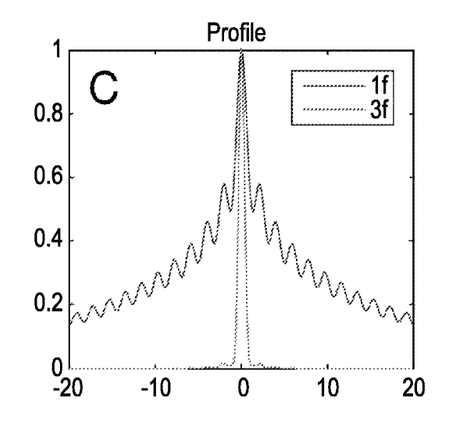
FIG. 3C shows simulated one-dimensional single- and three-photon transverse intensity profiles corresponding to the two-dimensional Bessel beam profiles of FIGS. 3A and 3B at the focal plane.
Figure 3D:
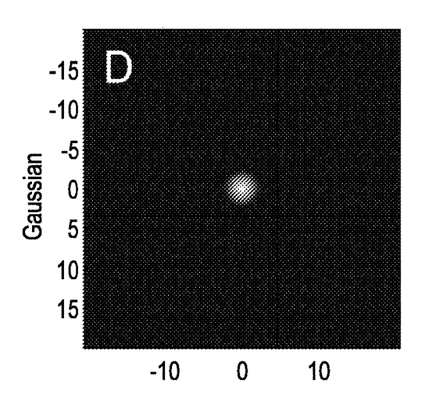
FIG. 3D is a simulated two-dimensional single-photon transverse intensity profile of a Gaussian beam at the focal plane.
Figure 3E:
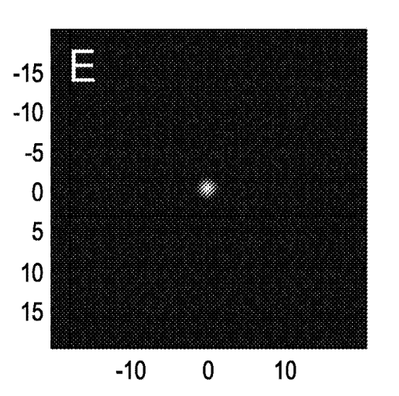
FIG. 3E is a simulated two-dimensional three-photon transverse intensity profile of a Gaussian beam at the focal plane.

FIGS. 3A and 3B show the two-dimensional transverse single-photon and three-photon intensity profiles of a Bessel beam at a focal plane of an ideal lens respectively for a numerical aperture (NA) of 0.2 and the corresponding one-dimensional transverse single-photon and three photon intensity profiles are plotted in FIG. 3C. Similarly, FIGS. 3D and 3E show the two-dimensional transverse single-photon and three-photon intensity profiles of a Gaussian beam at the focal plane of the ideal lens respectively for a NA of 0.2 and the corresponding one-dimensional transverse single-photon and three-photon intensity profiles are plotted in FIG. 3F. All units are in μm.

Figure 3F:
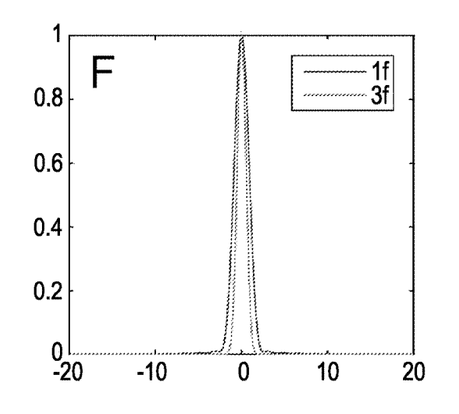
FIG. 3F shows simulated one-dimensional single- and three-photon transverse intensity profiles corresponding to the two-dimensional Gaussian beam profiles of FIGS. 3D and 3E at the focal plane.
Figure 4A:
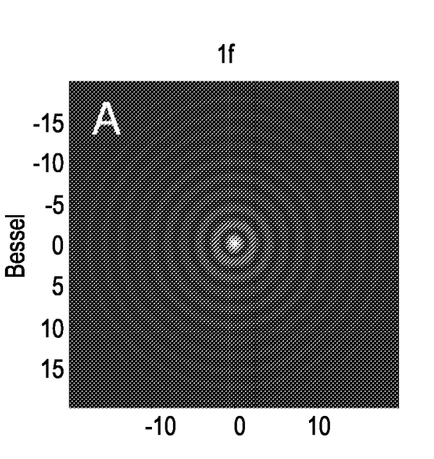
FIG. 4A is a simulated two-dimensional single-photon transverse intensity profile of a Bessel beam at a distance of 50 μm from the focal plane.
Figure 4B:
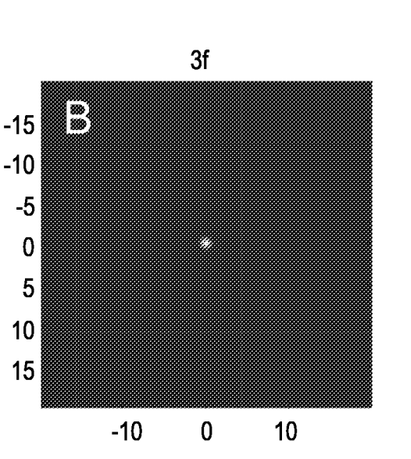
FIG. 4B is a simulated two-dimensional three-photon transverse intensity profile of a Bessel beam at a distance of 50 μm from the focal plane.
Figure 4C:
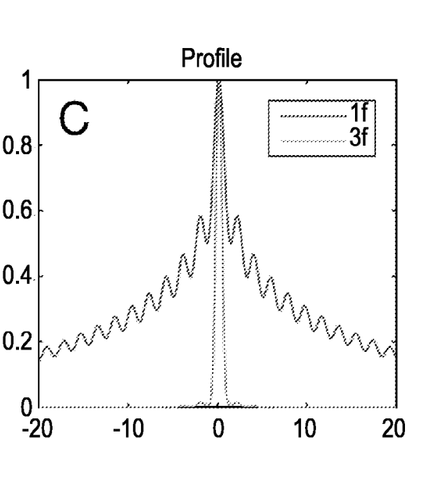
FIG. 4C shows simulated one-dimensional single- and three-photon transverse intensity profiles corresponding to the two-dimensional Bessel beam profiles of FIGS. 4A and 4B at a distance of 50 μm from the focal plane.
Figure 4D:
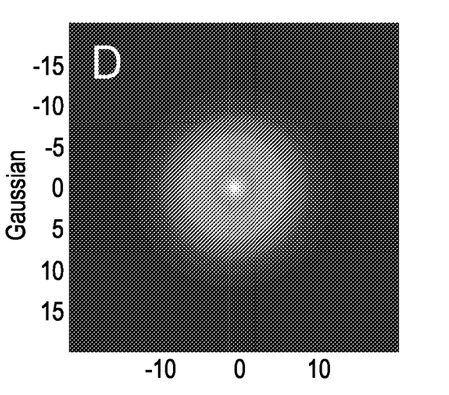
FIG. 4D is a simulated two-dimensional single-photon transverse intensity profile of a Gaussian beam at a distance of 50 μm from the focal plane.
Figure 4E:
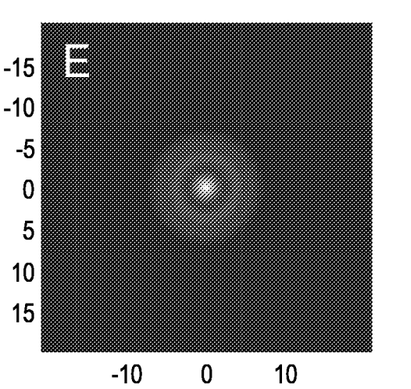
FIG. 4E is a simulated two-dimensional three-photon transverse intensity profile of a Gaussian beam at a distance of 50 μm from the focal plane.
Figure 4F:
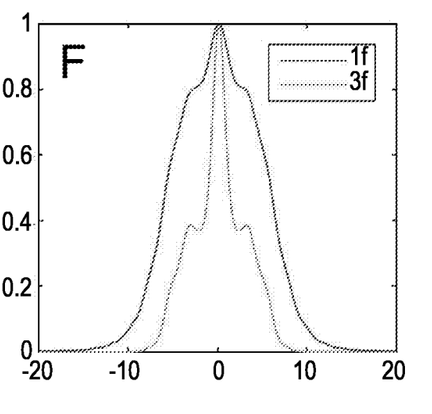
FIG. 4F shows simulated one-dimensional single- and three-photon transverse intensity profiles corresponding to the two-dimensional Gaussian beam profiles of FIGS. 4D and 4E at a distance of 50 μm from the focal plane.

Comparing FIGS. 3C and 3F, it may be seen that the three-photon intensity profile of the Bessel beam is surprisingly similar to the three-photon intensity profile of the Gaussian beam at focal plane of the ideal lens. More importantly, as shown in FIGS. 4A-4F the three-photon intensity profile of the Bessel beam is essentially propagation-invariant for distances of up to 50 μm from the focal plane of the ideal lens. The profiles of FIGS. 3A-4C suggest that a light sheet generated using a Bessel beam may have a three-photon intensity at the focal plane which is comparable to, or only marginally less than, the three-photon intensity at the focal plane of a light sheet generated using a Gaussian beam and three-photon intensities in regions either side of the focal plane which may actually be significantly greater than the three-photon intensities in regions either side of the focal plane of a light sheet generated using a Gaussian beam. In other words, the profiles of FIGS. 3A-4C suggest that a light sheet generated using a Bessel beam has the potential to provide a fluorescence image with an enhanced contrast or signal-to-background ratio (SBR) across an extended field of view compared with a Gaussian beam.

Figure 5A:
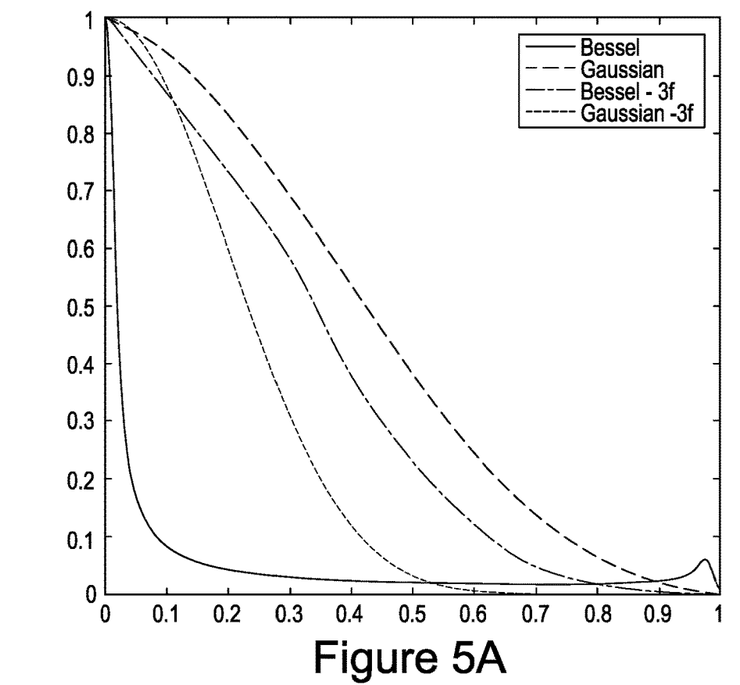
FIG. 5A is a plot of the simulated modulation transfer function against normalized spatial frequency for single- and three-photon Bessel and Gaussian beams at the focal plane.
Figure 5B:
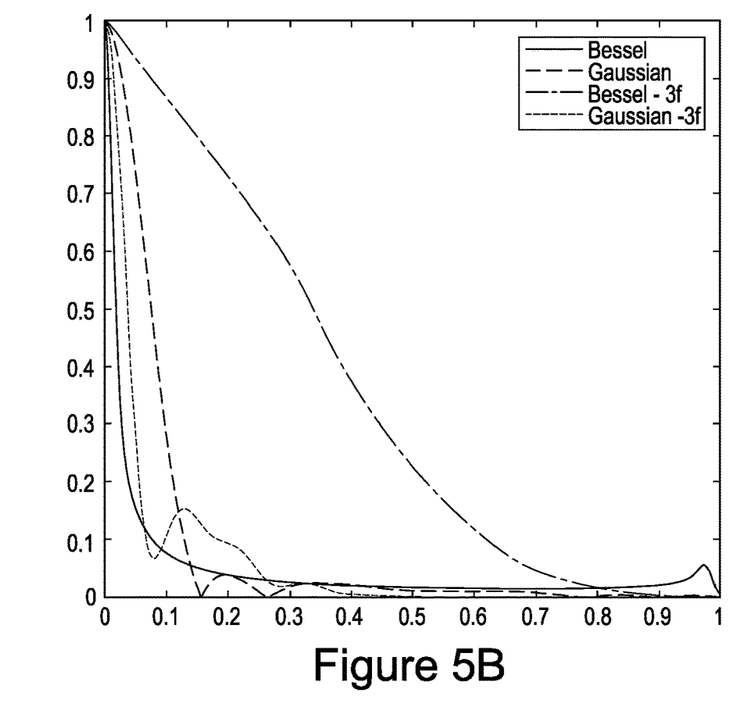
FIG. 5B is a plot of the simulated modulation transfer function against normalized spatial frequency for single- and three-photon Bessel and Gaussian beams at a distance of 50 μm from the focal plane.

FIG. 5A is a plot of the modulation transfer function (MTF) against normalized spatial frequency for the one- and three-photon Bessel and Gaussian beams of FIGS. 3A, 3B, 3C and 3D at the focal plane of the ideal lens for a numerical aperture (NA) of 0.2. Similarly, FIG. 5B is a plot of the modulation transfer function against normalized spatial frequency for the one- and three-photon Bessel and Gaussian beams of FIGS. 4A, 4B, 4C and 4D at a distance of 50 μm from the focal plane of the ideal lens for a NA of 0.2. In each case, the spatial frequency is normalized to the maximum transmitted spatial frequency 2 NA/λ, for a peak excitation wavelength λ of 800 nm. In each case, the one- and three-photon Bessel and Gaussian beams were assumed to comprise a stream of optical pulses that would typically have a Gaussian spectrum but no constraint on pulse duration is assumed. As shown in FIGS. 5A and 5B, the MTF for a three-photon Bessel beam is only marginally lower than the MTF for a three-photon Gaussian beam at the focal plane whereas the MTF for the three-photon Bessel beam is significantly higher than the MTF for the three-photon Gaussian beam at a distance of 50 μm from the focal plane. This demonstrates that the use of a Bessel beam for three-photon light sheet microscopy has the potential to provide fluorescence images across an extended field of view with both an axial and a lateral spatial resolution which are comparable to, or only marginally less than, those provided by a Gaussian beam at the focal plane.

Figure 6:
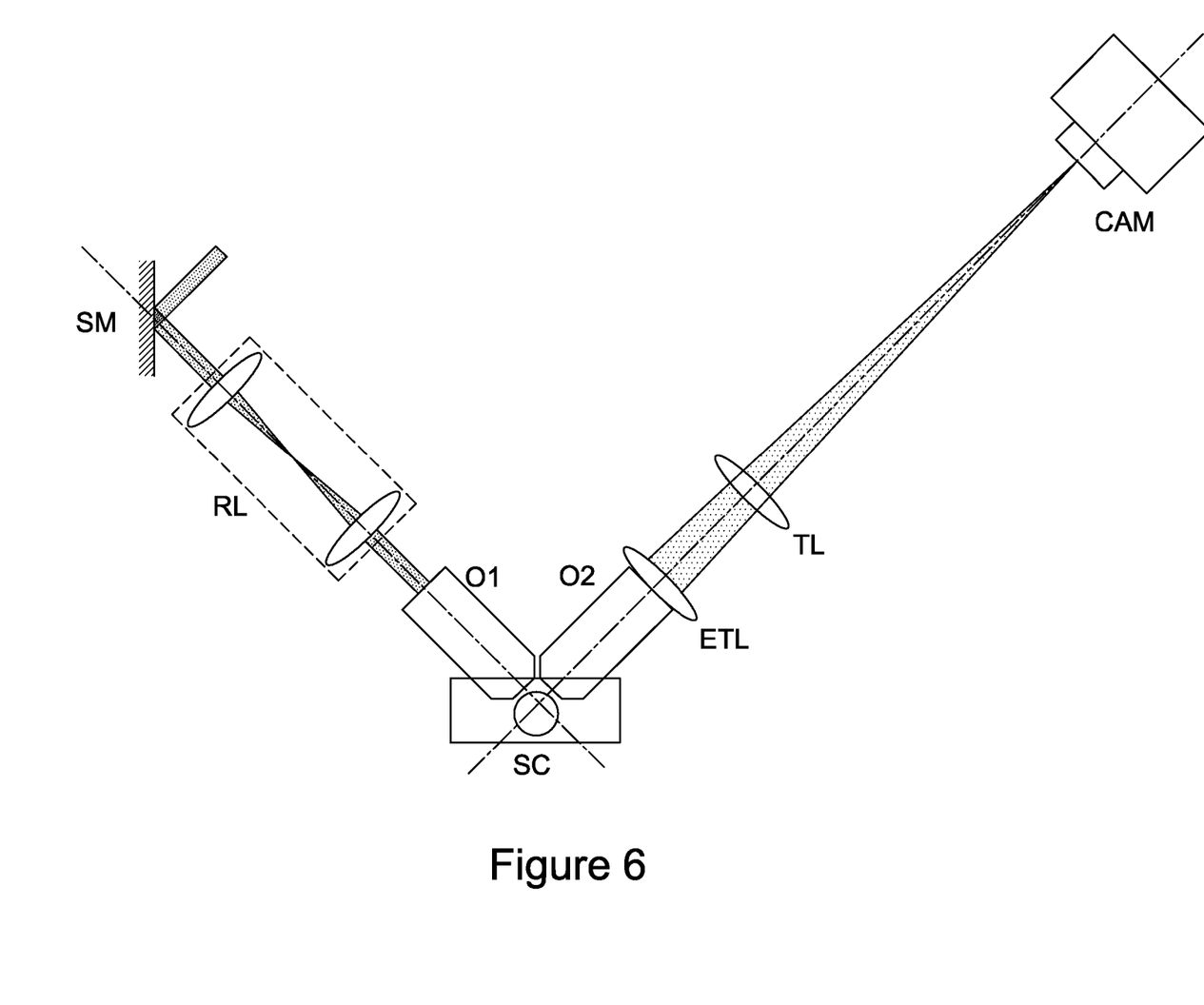
FIG. 6 is a schematic of a first alternative illumination and detection arrangement for use with the three-photon light sheet fluorescence microscopy system of FIG. 1.

FIG. 6 shows a first alternative illumination and detection arrangement for replacing the mirror $M_1$ and all of components in the optical path downstream of the mirror $M_1$ in the three-photon light sheet fluorescence microscopy system of FIG. 1. A sample (not shown) is located in a sample chamber SC and remains fixed as the light sheet is sequentially directed along different "planes" of the sample by a scanning mirror SM via a pair of relay lenses RL and an illumination objective O1. The fluorescence emitted from the generally "planar" illuminated region of the sample is imaged onto the image sensor or camera CAM by a detection objective O2, an electrically tuneable lens ETL, and a tube lens TL. The scanning mirror SM and the electrically tuneable lens ETL are synchronized so that the "plane" of illumination and the plane of detection (i.e. the imaged plane) correspond. This not only allows the sample to be kept stationary whilst image stacks are taken, but also allows fast scanning of the sample. This may be particularly important when monitoring one or more live and/or mobile samples.

Figure 7A:
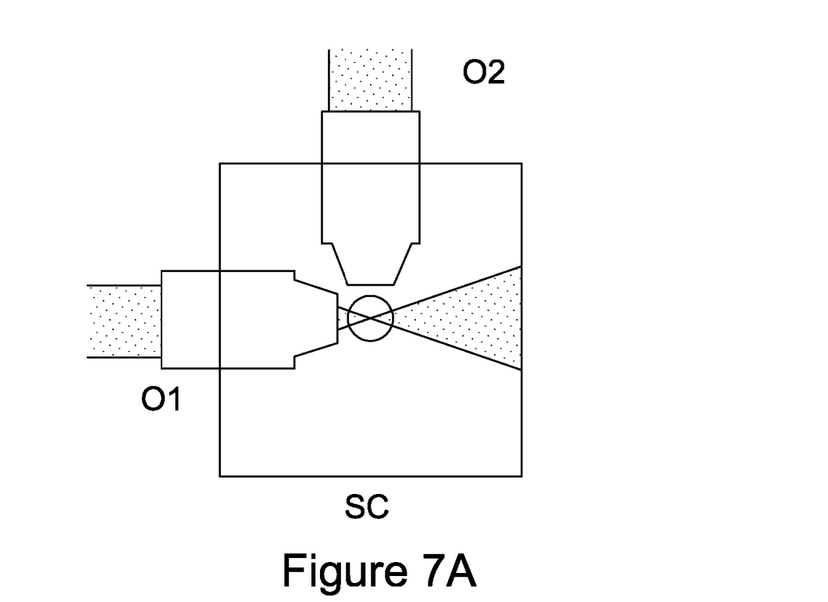
FIG. 7A is a schematic of a second alternative illumination and detection arrangement for use with the three-photon light sheet fluorescence microscopy system of FIG. 1.
Figure 7B:
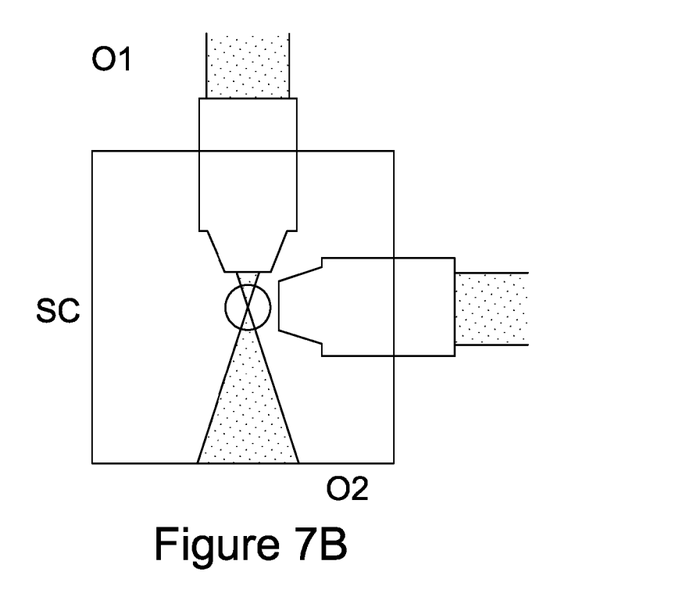
FIG. 7B is a schematic of a third alternative illumination and detection arrangement for use with the three-photon light sheet fluorescence microscopy system of FIG. 1.

FIG. 7A is a schematic of a second alternative illumination and detection arrangement for use with the three-photon light sheet fluorescence microscopy system of FIG. 1 in which the illumination objective O1 is oriented horizontally along a horizontal illumination axis and the imaging objective O2 is arranged vertically along a vertical imaging axis. Conversely, as shown in FIG. 7B, the illumination objective O1 may be oriented vertically along a vertical illumination axis and the imaging objective O2 may be arranged horizontally along a horizontal imaging axis.

Figure 8A:
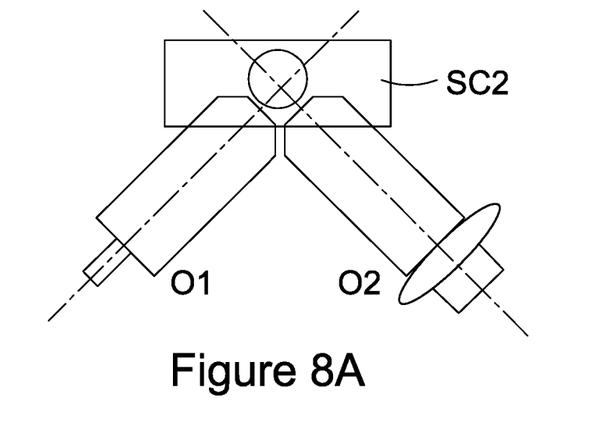
FIG. 8A is a schematic of an alternative sample chamber arrangement for use with the three-photon light sheet fluorescence microscopy system of FIG. 1.
Figure 8B:
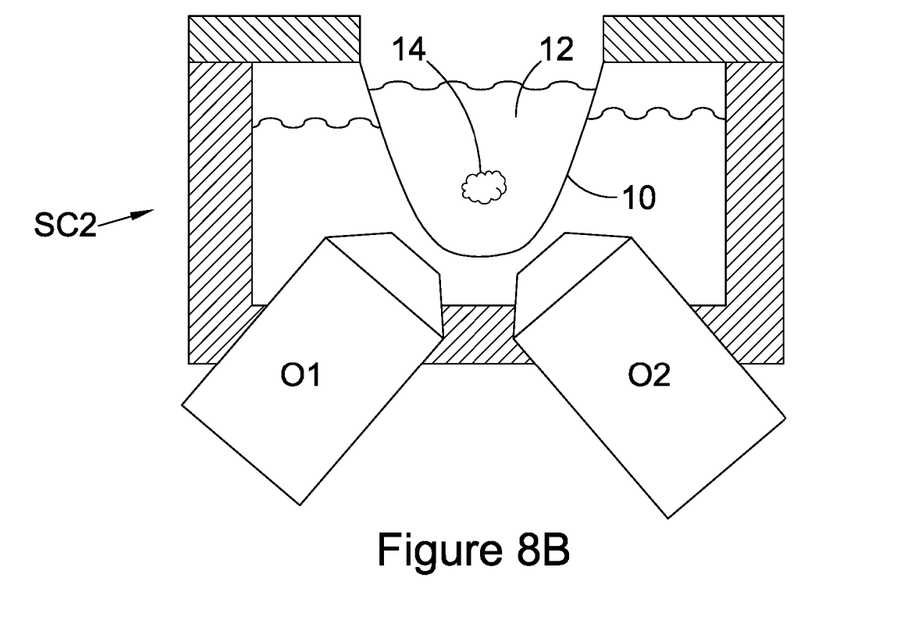
FIG. 8B is a detailed schematic of the alternative sample chamber arrangement of FIG. 7A.

FIGS. 8A and 8B show an alternative sample chamber arrangement SC2 for use with the three-photon light sheet fluorescence microscopy system of FIG. 1 in which the illumination and imaging objectives are arranged along orthogonal axes below a sample 14. The alternative sample chamber arrangement SC2 includes a transparent membrane 10 for containing a fluid 12 surrounding the sample 14. Such an alternative sample chamber arrangement SC2 may permit the fluid 12 and the sample 14 to be replaced without re-alignment of objective O1 and O2. The sample 14 may be positioned using optical trapping and/or acoustic trapping.

Figure 9:
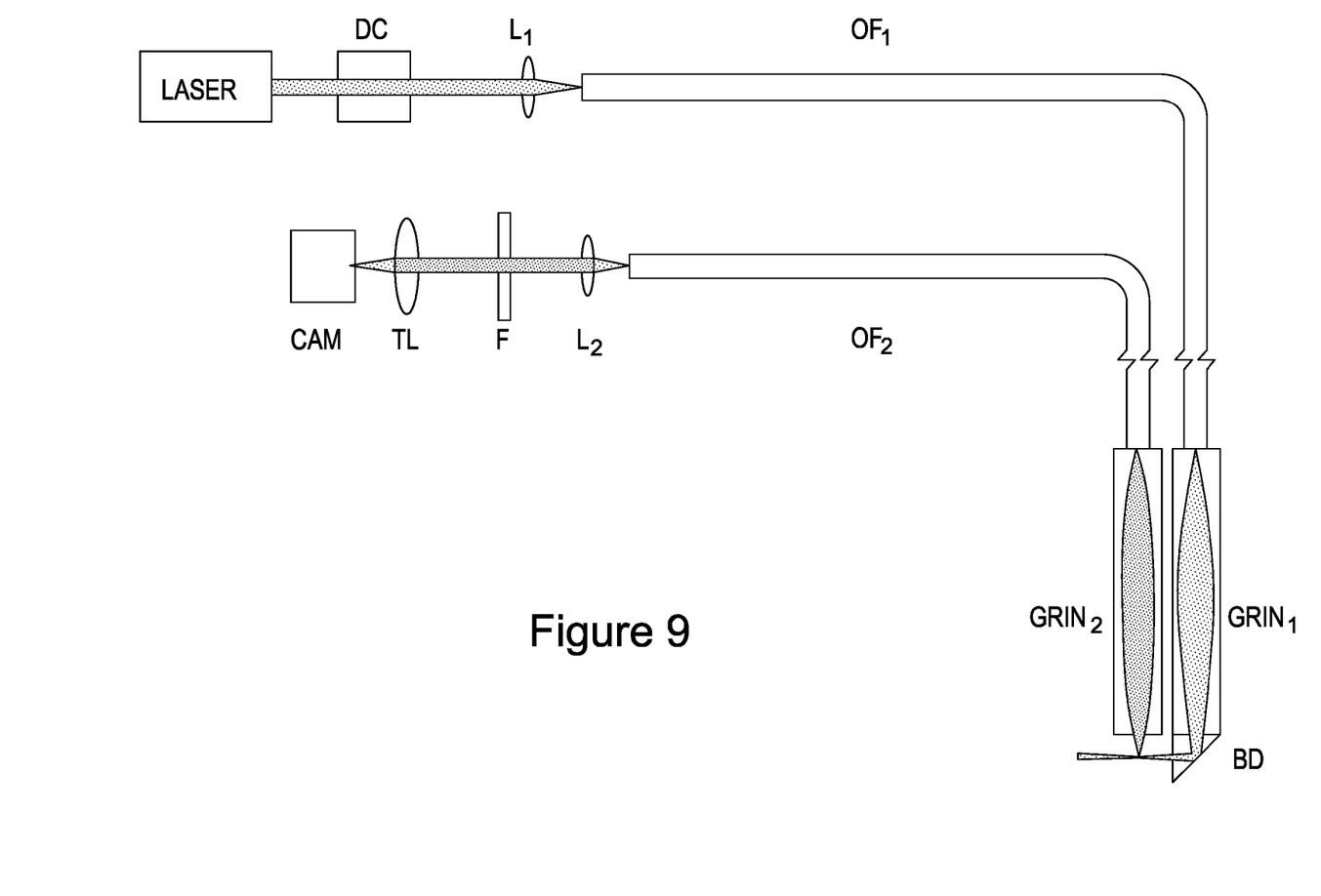
FIG. 9 is a schematic of a three-photon light sheet fluorescence microscopy system for use in vivo.

FIG. 9 shows a three-photon light sheet fluorescence microscopy system for imaging a sample (not shown) in vivo. The three-photon light sheet fluorescence microscopy system of FIG. 9 includes an illumination arrangement which includes a femtosecond laser, a dispersion compensation element DC, an input fiber coupling lens $L_1$, an input optical fiber $OF_1$, an illumination GRIN lens arrangement $GRIN_1$ and a micro-prism beam deflector BD.

The three-photon light sheet fluorescence microscopy system of FIG. 9 further includes a fluorescence collection arrangement which includes detection GRIN lens arrangement $GRIN_2$, an output optical fiber $OF_1$, an output fiber coupling lens $L_2$, a filter F for blocking light at the excitation wavelength, a tube lens TL and an image sensor or camera CAM.

The illumination GRIN lens arrangement $GRIN_1$ includes at least one cylindrical GRIN lens for the generation of a light sheet at a position below the detection GRIN lens arrangement $GRIN_2$.

In use, a sample (not shown) is either treated with, or otherwise exposed to, an exogenous fluorescent substance such as a green fluorescent protein or a red fluorescent protein or the like for three-photon excitation by a light sheet generated by the microscopy system. Alternatively, the sample (not shown) may include an endogenous fluorescent substance such as an endogenous fluorophore such as NADH and/or one or more flavins for three-photon excitation by a light sheet generated by the microscopy system.

The laser generates a stream of pulses at a wavelength in the range 1000 to 1800 nm. The dispersion compensation element DC is used to compensate for dispersion in the input fiber coupling lens $L_1$, the input optical fiber $OF_1$, the cylindrical illumination GRIN lens arrangement $GRIN_1$, the micro-prism beam deflector BD and the sample (not shown) to ensure that the pulses having a duration of the order of a hundred fs or less and a peak power of the order of 100 nJ or less at the light sheet for the three-photon excitation of the fluorophore in the sample (not shown). The input optical fiber $OF_1$ may be configured to provide anomalous dispersion and the dispersion compensation element DC may comprise a normally dispersive element to pre-chirp the optical pulses generated by the laser for compression of the pulses at the light sheet. For example, the input optical fiber $OF_1$ may be a hollow-core photonic bandgap fiber. The dispersion compensation element DC may comprise or be formed from a normally dispersive material such as glass, may comprise a normally dispersive optical fiber and/or may comprise one or more chirped mirrors.

The fluorescence generated in the sample is collected by the detection GRIN lens arrangement $GRIN_2$ and imaged onto the camera CAM via the output optical fiber $OF_1$, the output fiber coupling lens $L_2$, the filter F and the tube lens TL. One of ordinary skill in the art will understand that the compact arrangement provided by the input optical fiber OF1, the illumination GRIN lens arrangement $GRIN_1$ and the micro-prism beam deflector BD, makes the three-photon light sheet fluorescence microscopy system of FIG. 8 particularly suitable for in vivo imaging applications.

One of ordinary skill in the art will understand that in each of the illumination and detection arrangements described with reference to FIGS. 1-9, a sample is illuminated by one or more light sheets for three-photon excitation of the sample along an illumination axis and fluorescence is collected along a detection axis which is generally orthogonal to the illumination axis. Other illumination and detection arrangements are also possible in which the illumination axis and the detection axis are arranged orthogonally. Additionally or alternatively, a sample may be illuminated by a first light sheet travelling in a first direction along an illumination axis and a second light sheet travelling in a second direction along the illumination axis, wherein the second direction is opposite to the first direction.

At least some of optical components of the illumination arrangement of the three-photon light sheet fluorescence microscopy system of FIG. 1 may be re-arranged. For example, the order in which the optical component $MK_1$ and the light sheet generating element LSG appear in the optical path may be reversed.

The light sheet may be formed from and/or may comprise a superposition or an array of beams such as an array of Bessel beams.

Rather than using a Bessel beam, it may be possible to use a different non-diffractive and/or propagation invariant beam such as an Airy beam and/or a parabolic beam to create the light sheet. One of ordinary skill in the art will appreciate that such non-diffractive and/or propagation invariant beams may be produced by replacing the component MK1 of FIG. 1 with a suitably configured spatial light modulator and/or a digital micro mirror. Alternatively, an Airy beam may be produced using a cylindrical lens which is tilted with respect to a direction of propagation of the light from the laser. One of ordinary skill in the art will also appreciate that some non-diffractive and/or propagation invariant beams such as an Airy beam or a parabolic beam may be considered to propagate along a curved path in the sense that such beams may have a central intensity maximum and one or more intensity side-lobes, wherein the intensity maximum follows a curved path which may, for example, be parabolic. For such beams, the resulting light sheet may be curved and references to a "plane" as used in the description above should be understood to encompass such a curved sheet. One of ordinary skill in the art will also understand that linear deconvolution can be used to compensate for artefacts in the image of the fluorescence generated when using a curved light sheet such as a light sheet formed from an Airy beam, thereby effectively "cancelling" the curvature of the Airy beam light sheet.

The light sheet may be formed from and/or may comprise a superposition or an array of Airy beams.

The light sheet may be formed from and/or may comprise a superposition or an array of parabolic beams.

An optical source other than a laser may be used. For example, a different coherent optical source such as an optical parametric oscillator (OPO) may be used.

The optical source may comprise a wavelength conversion element or component for converting or adjusting a wavelength of the generated light. For example, the optical source may comprise a photonic crystal rod for soliton self-frequency shifting. The optical source may be tuneable.

The invention claimed is:

1. A light sheet imaging system comprising:
an illumination arrangement for generating a light sheet for three-photon excitation of a fluorescent sample; and
a fluorescence collection arrangement for collecting fluorescence generated in the sample as a result of three-photon excitation by the light sheet,
wherein the light sheet is a non-diffractive, propagation-invariant light sheet and the light sheet is formed from and/or comprises an Airy beam having an intensity maximum and one or more intensity side-lobes, wherein the intensity maximum follows a curved path or the light sheet is formed from and/or comprises a parabolic beam having an intensity maximum and one or more intensity side-lobes, wherein the intensity maximum follows a curved path.

2. A light sheet imaging system according to claim 1, wherein the illumination arrangement comprises a light sheet generating element for use in converting an optical beam into the light sheet.

3. A light sheet imaging system according to claim 2, wherein the light sheet generating element comprises at least one of a cylindrical lens, a cylindrical reflector and a cylindrical mirror or wherein the light sheet generating element comprises a scanner.

4. A light sheet imaging system according to claim 2, wherein the illumination arrangement comprises an optical source, wherein the illumination arrangement comprises an optical component which is configured to convert an optical beam generated by the optical source into a non-diffractive, propagation-invariant optical beam, and wherein the light sheet generating element is configured to convert the non-diffractive, propagation-invariant optical beam into the non-diffractive, propagation-invariant light sheet.

5. A light sheet imaging system according to claim 4, wherein the optical component comprises a fixed, static and/or passive optical component.

6. A light sheet imaging system according to claim 4, wherein the optical component comprises at least one of an axicon, a phase mask and a cylindrical lens which is tilted relative to a direction of propagation.

7. A light sheet imaging system according to claim 4, wherein the optical component is dynamic and/or re-configurable.

8. A light sheet imaging system according to claim 7, wherein the optical component comprises a diffractive optical component.

9. A light sheet imaging system according to claim 2, wherein the illumination arrangement comprises an optical source, wherein the illumination arrangement comprises an optical component, wherein the light sheet generating element is configured to convert an optical beam generated by the optical source into an intermediate light sheet, and wherein the optical component is configured to convert the intermediate light sheet into the non-diffractive, propagation-invariant light sheet.

10. A light sheet imaging system according to claim 1, wherein the illumination arrangement comprises an input GRIN lens for coupling the light sheet into a sample and the fluorescence collection arrangement comprises an output GRIN lens for collecting fluorescence emitted from the sample, wherein the input and output GRIN lenses are arranged with their respective optical axes parallel to one another and the illumination arrangement further comprises a reflector, a mirror, or a deflector for deflecting light received from the input GRIN lens towards the sample.

11. A light sheet imaging system according to claim 10, wherein the illumination arrangement comprises an input optical fiber for coupling light to the input GRIN lens and the fluorescence collection arrangement comprises an output optical fiber for receiving light from the output GRIN lens, and wherein the input and output fibers are arranged side-by-side.

12. A light sheet imaging system according to claim 1, wherein the light sheet comprises at least one of:
one or more wavelengths in the range 700 nm to 1800 nm;
one or more wavelengths between 1030 nm and 1050 nm;
one or more wavelengths between 1540 nm and 1560 nm; or
one or more wavelengths between 1665 nm and 1685 nm.

13. A light sheet imaging system according to claim 1, wherein the light sheet is configured for three-photon excitation of exogenous fluorophores and/or the light sheet is configured for three-photon excitation of endogenous fluorophores.

14. A light sheet imaging system according to claim 13, wherein the light sheet is configured for three-photon excitation of a green fluorescent protein or a red fluorescent protein and/or wherein the light sheet is configured for three-photon excitation of NADH or a flavin.

15. A light sheet imaging system according to claim 1, wherein the illumination arrangement comprises an optical source, and wherein the optical source is coherent.

16. A light sheet imaging system according to claim 1, wherein the illumination arrangement comprises an optical source, and wherein the optical source comprises a laser and/or an optical parametric oscillator (OPO).

17. A light sheet imaging system according to claim 1, wherein the illumination arrangement comprises an optical source, and wherein the optical source is tuneable.

18. A light sheet imaging system according to claim 1, wherein the illumination arrangement comprises an optical source, and wherein the optical source is configured to generate a stream of optical pulses.

19. A light sheet imaging system according to claim 18, wherein at least one of:
the stream of optical pulses has an average power of at least 1 mW, at least 5 mW, at least 10 mW, at least 50 mW or at least 100 mW;
each optical pulse has a duration of 1 ps or less, 500 fs or less, or 100 fs or less; or
each optical pulse has an energy of at least 10 nJ, at least 50 nJ, at least 100 nJ or at least 500 nJ.

20. A light sheet imaging system according to claim 18, wherein the illumination arrangement comprises a pulse compression arrangement for compressing the optical pulses.

21. A light sheet imaging system according to claim 20, wherein the pulse compression arrangement comprises at least one of:
one or more elements or components for providing anomalous dispersion; or
one or more elements or components for providing normal dispersion.

22. A light sheet imaging system according to claim 1, wherein the illumination arrangement comprises an optical source, and wherein the illumination arrangement comprises a wavelength conversion element or component for converting or adjusting a wavelength of light generated by the optical source.

23. A light sheet imaging system according to claim 1, wherein the light sheet imaging system comprises, or forms part of, a light sheet microscope.

24. A method of light sheet imaging comprising:
using a light sheet for three-photon excitation of a fluorescent sample; and
collecting fluorescence generated in the sample as a result of three-photon excitation of the sample by the light sheet,
wherein the light sheet is a non-diffractive, propagation-invariant light sheet and the light sheet is formed from and/or comprises an Airy beam having an intensity maximum and one or more intensity side-lobes, wherein the intensity maximum follows a curved path or the light sheet is formed from and/or comprises a parabolic beam having an intensity maximum and one or more intensity side-lobes, wherein the intensity maximum follows a curved path.

25. A method of light sheet imaging according to claim 24, wherein the light sheet is configured for three-photon excitation of a green fluorescent protein or a red fluorescent protein and/or wherein the light sheet is configured for three-photon excitation of NADH or a flavin.

* * * * *